Dec. 26, 1967   J. M. BOYTE   3,359,654
APPARATUS FOR DEMONSTRATING THE VARIATION OF THE TRIGONOMETRIC
FUNCTIONS IN A TWO DIMENSIONAL SYSTEM
Filed Nov. 22, 1965   4 Sheets-Sheet 1
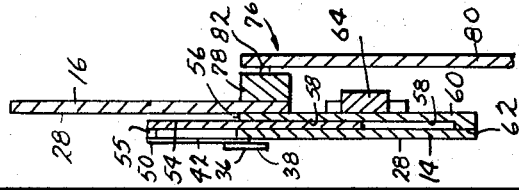
INVENTOR
JAMES M. BOYTE
BY Cushman, Darby & Cushman
ATTORNEYS

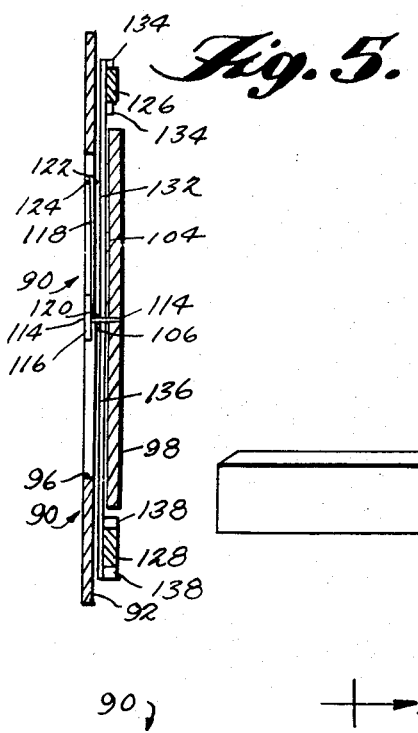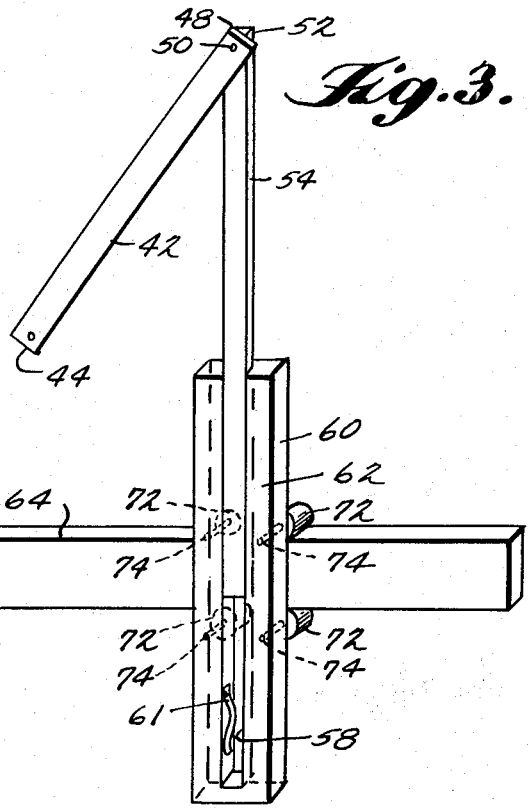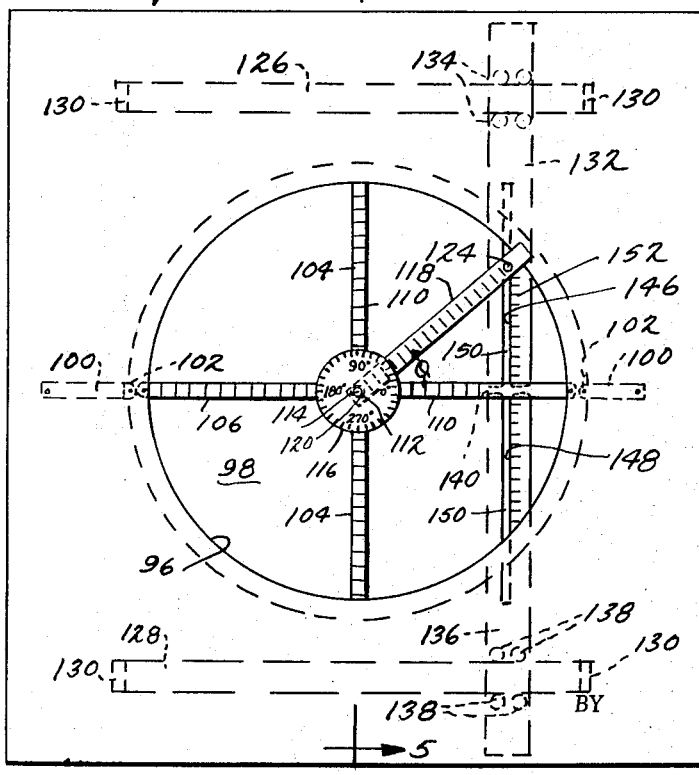

INVENTOR
JAMES M. BOYTE

Dec. 26, 1967  J. M. BOYTE  3,359,654
APPARATUS FOR DEMONSTRATING THE VARIATION OF THE TRIGONOMETRIC
FUNCTIONS IN A TWO DIMENSIONAL SYSTEM
Filed Nov. 22, 1965  4 Sheets-Sheet 4
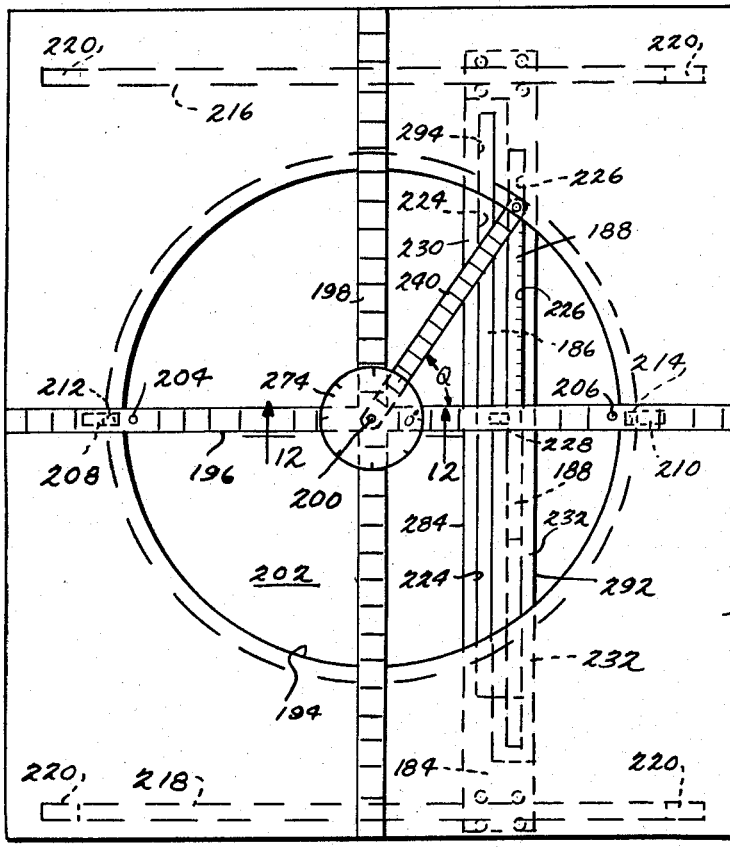
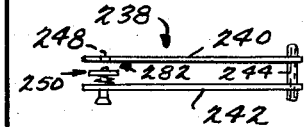
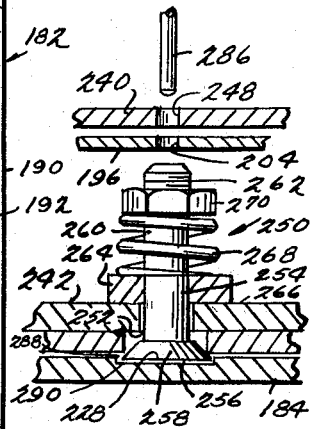
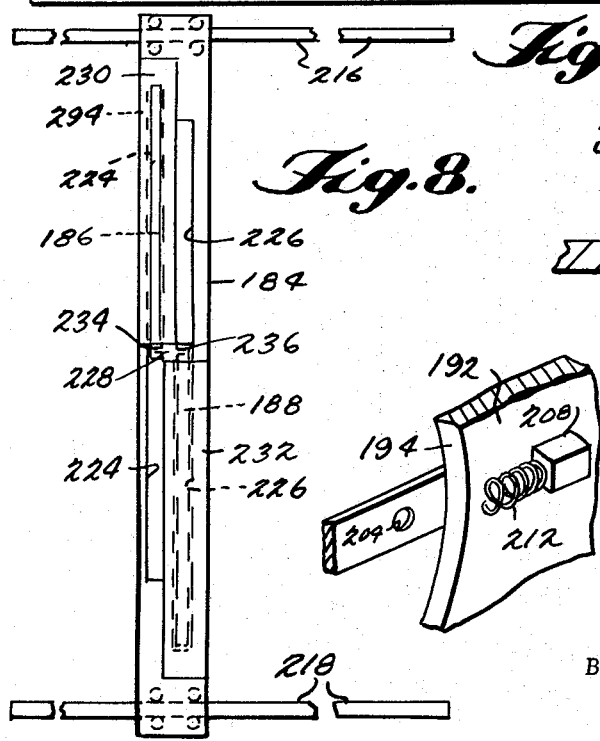
INVENTOR
JAMES M. BOYTE
BY Cushman, Darby & Cushman
ATTORNEYS United States Patent Office 3,359,654
Patented Dec. 26, 1967

3,359,654
APPARATUS FOR DEMONSTRATING THE VARIATION OF THE TRIGONOMETRIC FUNCTIONS IN A TWO DIMENSIONAL SYSTEM
James M. Boyte, Star Rte., Carthage, N.C. 28327
Filed Nov. 22, 1965, Ser. No. 509,125
10 Claims. (Cl. 35—34)

The present invention relates to teaching machines and more particularly to apparatus for demonstrating the variation of the trigonometric functions in a two dimensional system.

Trigonometry and plane geometry have traditionally been taught with the aid of tables of trignometric functions both in tabular form and a juxtaposed logarithmic scales and with the aid of series of static pencil-and-paper or chalk-and-blackboard sketches. Using such traditional materials, it is difficult for all but exceptional students to construct a well developed, lasting mental picture of the relative instantaneous rate of change of the various trigonometric functions with the increase and decrease of the included angle between the hypotenuse and adjacent sides of a right triangle. For this reason many teaching aids have been proposed for providing a changeable indication of the trigonometric functions. However, certain drawbacks of these prior art devices have precluded their wide-spread use. For instance, many of them are susceptible of operation through only one or two quadrants. Some require two or three hands to manipulate and so are difficult to use as a lecture demonstration since the person or persons operating the device necessarily block the view of the students. Still others of prior art devices are unattractive and confusing to students since various portions of indicators not a part of the particular demonstration being conducted cannot be hidden from view.

Broadly speaking, it is an object of the present invention to eliminate the drawbacks of prior art devices enumerated above.

It is a further object of the present invention to provide apparatus for demonstrating the instantaneous rate of change of the various trigonometric functions with the increase and decrease of the included angle between the hypotenuse and adjacent sides of a right triangle in a two dimensional system as the hypotenuse is rotated through all four quadrants.

Another object of the invention is the provision of devices of the type described which can be manipulated for the most part with one hand so that the demonstrator need not block the students' view of the device.

Yet another object of the present invention is the provision of devices of the type described that will provide accurate indications whether they are positioned generally vertically or generally horizontally and do not rely upon precise verticality of the Y axis for providing accurate indications.

These and further objects of the present invention as well as the principles and scope of applicability thereof will become more clearly apparent during the following detailed discussion which relates to the four embodiments that are illustrated in the attached drawings.

In the drawings:

FIGURE 1 is a front elevation view of a first embodiment of the apparatus according to the present invention;

FIGURE 2 is a transverse vertical sectional view through the apparatus of FIGURE 1, taken substantially along line 2—2 thereof;

FIGURE 3 is a fragmentary perspective view of the movable portions of the apparatus of FIGURES 1 and 2;

FIGURE 4 is a front elevation view of a second embodiment of the apparatus according to the present invention;

FIGURE 5 is a transverse vertical sectional view through the apparatus of FIGURE 4, taken substantially along line 5—5 thereof;

FIGURE 7 is a front elevation view of a fourth embodiment of the apparatus of the present invention;

FIGURES 8–10 are elevation views of details of the fourth embodiment shown in FIGURE, 7 specifically, FIGURE 8 is a rear elevation view of the opposite side carrying slide and track assembly, FIGURE 9 is a side elevation view of the hypotenuse assembly and FIGURE 10 is a side elevation view to an enlarged scale, showing the spring lock of the hypotenuse assembly;

FIGURE 11 is a rear fragmentary perspective of the spring loaded stop shown at the left in FIGURE 7; and FIGURE 12 is a fragmentary cross-sectional view taken substantially along the line 12—12 of FIGURE 7.

Figure 6:
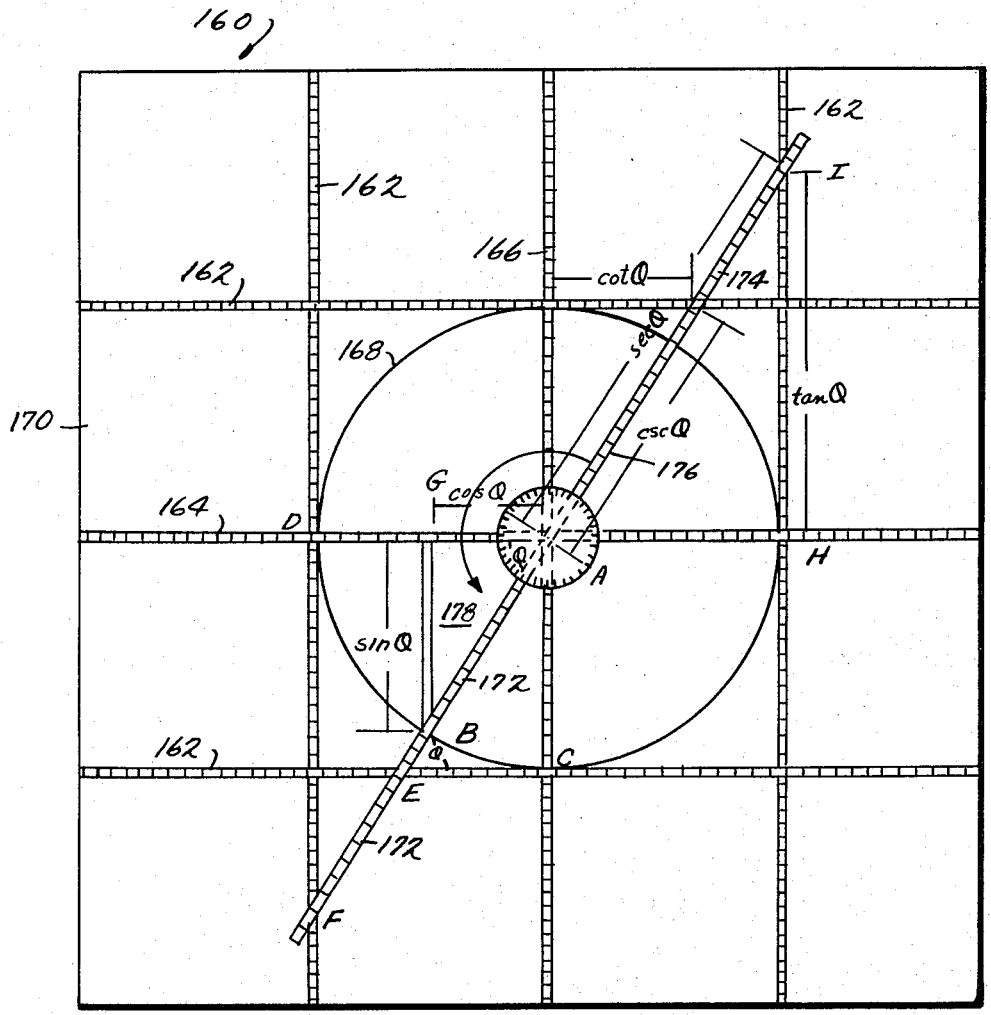
FIGURE 6 is a somewhat diagrammatic front elevation view of a third embodiment of the apparatus of the invention.

Now having particular reference to FIGURES 1–3 the trigonometric function teaching machine 10 includes a rectangular back board 12 which comprises a front-most lower portion 14 and a rear-most upper portion 16 (FIGURE 2). As shown, the upper portion 16 is greater in height than the lower portion 14, but because the two overlap, the upper and lower portions appear to be of equal height from the front. Preferably, the front surface of the back board 12 is painted or otherwise colored a dark color, flat black being preferred. The portions 14 and 16 may be secured to one another in any convenient manner, for instance by blocks 18 glued to each at the lateral margins of the overlapping region of the portions 14 and 16.

If the apparatus 10 is to be used for demonstration before a body of students, it is most preferably oriented so that the back board 12 as seen in FIGURE 1 is in front elevation. However, vertical orientation of the apparatus 10 is not a prerequisite to obtaining valid readings therefrom and the apparatus 10 could be oriented so that FIGURE 1 would represent a top plan view of the apparatus. As best seen in FIGURE 1, the upper margin of the front surface of the back board lower portion 14 has a representation of the horizontal or X-axis 20 applied thereto. The X-axis may comprise white or other light colored paint, a decalcomania, adhesive tape or similar material. The X-axis may be ruled or marked with indicia in two vertically spaced series 22, 24. The upper series 22 is right side up in FIGURE 1 and graduates leftwardly toward larger negative numbers and rightwardly toward larger positive numbers from an origin at 26. The series 24 would fit the description just outlined, were the apparatus inverted so that the series 24 were the upper series.

A representation of the vertical or "Y"-axis 28 similar in composition to the X-axis is applied to the front surface of the back board so as to extend vertically thereon and pass through the origin 26. As seen in FIGURE 2, the Y-axis 28 actually comprises two halves each applied to a section of the back board in vertical alignment with the other. Similar, the Y-axis may carry two horizontally spaced series 30, 32 of indicia radiating from the origin, inverted with respect to each other and oriented so that the series which is right side up graduates upwardly toward larger positive numbers and downwardly toward larger negative numbers from the origin 26. The traditional system of quadrants may be indicated on the front surface of the board 12 as indicated at 34 in two series inverted with respect to each other so that one series is identical to the other but for rotation by 180 degrees about the origin 26.

A pin or axle 36 is secured to the bottom portion 14 so as to protrude perpendicularly from the portions 14 and 16 at the origin 26. At the outer end of the pin 36 a disk 38 is fixedly mounted. The disk 38 is preferably transparent and may be a 360 degree protractor. In any event, the disk 38 includes two concentric series of degree markings 40 of 0–360 degrees which begin at the three o'clock position and respectively progress clockwise and counterclockwise.

A bar 42 representing the hypotenuse has a hole transversely through it near one end 44 thereof whereby the bar 42 is mounted on the pin 36 between the disk 38 and the Y-axis on the portion 14 for pivotal movement 180 degrees around the pin 36 as indicated by the arrows 46. The hypotenuse bar is transversely slotted adjacent its opposite end 48 and optionally at additional points therealong for receiving a pivot pin 50 by which it is pivotally secured to the end 52 of a bar 54 which represents the opposite side. A spacer washer 55 may be provided as shown. The bars 42 and 54 are light colored, similar to the X and Y-axes and may be marked with indicia in the form of one or more series of numbers which in the case of the bar 42 graduate from the end 44 and, in the case of the bar 54, graduate from the end 52. The bar 54 extends vertically from its end 52 through the slot 56 between the upper and lower back board portions and is slidingly received in a vertically extending guide channel or pocket 58 in a carriage 60 which has its upper and lower extent respectively adjacent the upper and lower extent of the back board lower portion 14 so it cannot be seen from the front of the apparatus 10. As best seen in FIGURE 3, the channel 58 on carriage 60 shown extends from the top of the carriage 60 to a point near, but above, the bottom of the carriage 60 to define a well. The channel or pocket 58 rather than being forwardly opening could be positioned interiorly of the carriage 60. Means such as leaf springs 61 can be provided in the carriage well to overcome the effect of gravity on the hypotenuse and opposite side bars. The springs should not bend on the opposite side bar so much that manual manipulation of the hypotenuse and opposite side bars is materially inhibited. If the opposite side bar is composed of ferrous material, magnets can be used instead of, or in addition to, springs.

The carriage 60 is positioned so that its forward face 62 is slidingly adjacent the rear face of the lower back board portion 14. The carriage is supported by a horizontal track 64 spaced from the portion 14 by an amount slightly greater than the thickness of the carriage 60 and secured to the portion 14 adjacent its lateral margins by means such as blocks 66 glued to the track 64 and to the portion 14. The upper and lower surfaces 68, 70 of the track 64 rollingly support two rollers or wheels 72 each, all secured to the carriage 60 via axles 74 which project perpendicularly from the forward surface of the carriage.

The apparatus 10 of FIGURES 1–3 is completed by a support stand 76 which may include a mounting block 78 positioned centrally of the lower region of the upper portion 16 of the back board and projecting rearwardly sufficiently to clear the track 64, and a floor supported vertical member 80. The block 78 and vertical member 80 are shown secured to one another by pivot means 82 which allows rotation of the back board to effect the inversion thereof.

The apparatus 10 of FIGURES 1–3 is completed by 48 of the hypotenuse and rotating the hypotenuse about the origin 26. The majority of the apparatus 10 can be fabricated from plywood, composition board, metal sheet or plate or similar conventional material. It is important that the carriage, its track and the carriage wheels be composed of material which will allow easy gliding movement of the carriage along the track. Metal composition for these members is preferred, but lubricous plastic material or the like could be used in whole or in part.

The apparatus 10 is useful to demonstrate what happens to the sides of a right triangle defined between the X-axis (the adjacent side), the opposite side and the hypotenuse as the angle $\phi$ is varied between 0 degrees and 360 degrees. Since the variation of the trigonometric functions are dependent on the ratio of the various triangle sides, the variation of these functions can also be demonstrated with the device 10.

For example, considering the sine of the angle $\phi$ equal to the ratio of the length of the opposite side to that of the hypotenuse, the hypotenuse is first placed so that it extends horizontally rightward. At this point, the opposite side is completely out of sight in the carriage well and the sine is therefore equal to 0. As the hypotenuse is rotated counter-clockwise, the angle $\phi$ increases to 90 degrees where the hypotenuse and opposite side are of equal length, the sine there being equal to +1. In like manner the hypotenuse can be rotated counter-clockwise to a horizontally leftward position wherein the angle $\phi$ is 180 degrees. The back board is then rotated 180 degrees about the block 78 and support 80 and the hypotenuse rotated from a horizontally rightward position 180 degrees to a horizontally leftward position at which again equals 180 degrees. The demonstration is then continued increasing the angle $\phi$ from 180 degrees through 270 degrees to 360 degrees by rotating the hypotenuse counter-clockwise. Because of the double sets of axis indicia employed, the correct values and signs for the trignometric functions in the various quadrants can be obtained merely by employing the set of indicia which is right-side-up when the observation is made.

The apparatus 90 shown in FIGURES 4 and 5 provides the same demonstration capability as the apparatus 10 shown in FIGURES 1–3 and functions generally similarly as will appear, the chief difference being that the angle $\phi$ can be varied through 360 degrees using the device 90 without an inversion of the apparatus being required. FIGURE 4, a front elevation view, illustrates, but for the dotted lines, the apparatus as the students see it. FIGURE 5 is a valuable aid to an understanding of the device 90 as it indicates the relative front-to-back positioning of the elements of the device.

The back board 92 includes a forward, peripheral portion 94, shown being generally rectangular or square and having a large central circular cut out 96 and a rear, central portion 98 shown being disk-shaped, having a diameter slightly exceeding that of the cut out 96. The disk 98 is secured to the square 94 by means such as a pair of straps 100 shown secured to the back of the square 94 on the horizontal centerline thereof near its lateral margins and proceeding rearwardly as well as radially inwardly to their points of securement 102 to the disk 98. The points 102 lie in the overlap of the disk 98 and square 94.

As in the case of the apparatus 10, the backboard 92 of the apparatus 90 is preferably painted or otherwise colored a dark color, for instance flat black. In the embodiment 90, the strip 104 represents the Y-axis and is secured to the front face of the disk 98 so as to overlie a diameter of the disk 98 and extend vertically thereon. The strip 106 represents the X-axis which may be made of metal, plastic or fabric tape or the like, and is secured at either end to the back surface of the square 94 bridging the cut out 96 along a horizontal diameter thereof. Both the axes 104 and 106 are preferably white or light colored for contrast against the back board and include the set of indicia 110 as discussed in regard to the axes of FIGURE 1, radiating from the origin 112. An axle or pin 114 mounted on the disk 98 perpendicularly to the front surface of the disk 98 at the origin 112 fixedly mounts a 360 degree protractor or the like 116 at its outer end with the 0 degree mark of the protractor oriented at three o'clock. Preferably, the protractor 116 is transparent.

The hypotenuse bar 118 of the apparatus 90 has a hole laterally through one end 120 thereof by which it is pivotally received on the axle 114 between the protractor 116 and the horizontal, X-axis. The opposite end 122 of the hypotenuse bar 118 carries a rearwardly projecting dowel or the like 124. Alternatively, the hypotenuse bar 118 could be positioned behind the X-axis and carry a forwardly projecting dowel 124.

The apparatus 90 further includes an upper horizontal track 126 and a lower horizontal track 128 similar to their single counterpart in the apparatus 10 and similarly secured to the square 94 by blocks 130. An upper carriage 132 is supported on the track 126 via two vertically spaced wheel or roller pairs 134 and a lower carriage 136 is supported on the track 128 via two vertically spaced wheel or roller pairs 138. The carriages 132 and 136 project toward adjacency with one another just behind the X-axis, but fail to meet by an amount 140 which insures that either carriage when slid horizontally along its track will clear the pin or axle 114. As should be apparent from FIGURES 4 and 5, the carriages 132 and 136 are movable entirely independently of one another and the tracks 126 and 128 extend sufficiently leftwardly that either carriage when not in use can be stored behind the square 94 in the region 142 or 144.

Each carriage 132, 136 is shown having a frontward opening, vertically extending channel 146, 148 which extends from the end of the carriage nearest the X-axis at least far enough to equal a radius of the cutout 96 in length. Preferably, all surfaces of the carriages 132 and 136 are painted or colored the same dark color as the back board 92, except the forward facing rear surfaces 150 of the channels 146, 148 and indicia 152 adjacent them, both of which are painted white or other light colors with respect to the color of the carriages and back board.

The dowel 124 is adapted to be received in the channel 146 in order to demonstrate the variation of the trigonometric functions as the angle φ is increased from 0 degrees to 180 degrees, the dowelled end of the hypotenuse bar being rotated from a three-o'clock position counter-clockwise through a twelve-o'clock position to a nine-o'clock position with correspondent translation of the carriage 132 leftwardly.

Similarly, the dowel 124 is adapted to be received in the channel 148 in order to demonstrate the variation of the trigonometric functions as the angle φ is increased from 180 degrees to 360 degrees, the dowelled end of the hypotenuse bar being rotated from a nine o'clock position counter-clockwise, through a six-o'clock position to a three-o'clock position with correspondent translation of the carriage 136 rightwardly.

If the material of the hypotenuse bar is flexible enough, transfer of the dowel 124 from one carriage channel to the other can be effected by flexing the hypotenuse bar forwardly. If such flexibility is not present, the dowel 124 could be made wholly or partly withdrawable from the hypotenuse bar for instance by a spring urged arrangement. Means could be provided to releasably lock the dowel 124 in the carriage channel in which it was being used.

It should be apparent that the right triangle to be considered by the students observing the apparatus 90 is defined between the hypotenuse bar, the X-axis and the forward facing rear surface of the carriage being used. It is an advantage of the device according to the apparatus 90 of the present invention that only so much of the carriage channel as is necessary to complete the right triangle is visible to the students. Thus the presentation can be given in an uncluttered manner, with the assurance that the students will always be observing the correct part of the correct line. The periphery of the cut out 96 may serve as a unit circle.

The criteria for selection of materials for constructing the apparatus 90 are substantially the same as those for the apparatus 10.

The modification 160 shown diagrammatically in FIGURE 6 may be applied to the apparatus 10 of FIGURES 1–3, the apparatus 90 of FIGURES 4 and 5 and/or the apparatus 182 of FIGURES 7–11 including the opposite side carriage or carriages thereof or the like. Four lines 162 perpendicular to the X or Y axes 164, 166 and tangent to the unit circle 168 are applied to the back board peripheral portion 170. Extensions 172 and 174 are secured to opposite ends of the hypotenuse bar 176 so that it projects considerably beyond the unit circle 168. For instance, the total length of the hypotenuse bar plus the extensions 172 and 174 could approximate the length of each tangent line 162 or axis 164, 166.

The apparatus 160 can be manipulated similarly to the apparatus of the remaining figures, but additional information can be derived from its operation.

As shown in FIGURE 6 the principal right triangle ABG is in the third quadrant 178 although the reference angle φ at the origin 180 in triangle ABG is also present in the similar triangles AFD and AEC in the third quadrant as indicated. Using the three right triangles ABG, AFD and AEC the values of all six trigonometric functions can be determined or at least their tendencies can be determined as the extended hypotenuse bar 172, 174, 176 is rotated. Because the circle 168 is a unit circle, the trigonometric ratios will have plus or minus 1 as their denominators and the values of the six trigonometric functions can be represented by the lengths of the appropriate sides of the triangles ABG, AFD and AEC in the third quadrant, and similar triangles in each of the other quadrants as will be apparent to those familiar with trigonometry.

Consider the tangent of the angle φ in the third quadrant. Its value is equal to the ratio of the opposite side to the adjacent side or $DF/AD$ which is equal to $DF/-1$ or $-DF$. Since DF is itself negative, the tangent of φ in the third quadrant has a positive value represented by the length of the line HI. As φ approaches 270 degrees by rotation of the extended hypotenuse bar it can be observed that the line HI representing the tangent of φ tends to infinite length because the intersection I becomes increasingly farther from the X-axis in a positive direction along the Y-axis. The lines whose lengths represent the remaining trignometric functions are indicated on FIGURE 6.

The apparatus 182 is similar to the apparatus 90 of FIGURES 4 and 5 but for the provision of a single carriage 184 which supports two alternately used opposite side bar 186, 188 and the provision of means for accomplishing the alternation between the opposite side bar 186 and 188.

The apparatus 182 includes a back board 190 comprising a peripheral portion 192, shown being generally square and having a circular cut out 194 whose periphery defines a unit circle. Indicia bearing X- and Y-axes 196, 198 are secured to the front surface of the portion 192 and arranged so that the origin 200 at the intersection of the X- and Y-axes is coincident with the geometric center of the cut out 194. A central disk-shaped portion 202 of the back board 190 is positioned behind the portion 192 with its center coincident with the center of the cut out 194. Preferably, the disk 202 is of slightly greater diameter than the cut out and the disk 202 is secured to the peripheral portion similarly to the manner discussed in regard to the corresponding parts of the apparatus 90.

As best seen in FIGURES 7 and 10, small openings 204 and 206 are formed through the X-axis within the cut out 194 adjacent each intersection of the cut out periphery with the X-axis. Stop block 208, 210 are mounted on the rear surface of the back board portion 192 and underlying the X-axis in the region where the two back board portions 192, 202 overlap, adjacent each opening 204, 206.

A coil spring 212, 214 is mounted by one end thereof to each stop block 208, 210 so as to project therefrom toward the origin 200 along an axis parallel to the rear surface of the back board portion 192.

The apparatus 182 further includes a pair of vertically spaced horizontal rails 216, 218, above and below the disk 202 respectively mounted on the rear surface of the portion 192 using blocks 220 similar to the corresponding elements in the apparatus 90. A carriage 184 is mounted between back portions 192 and 202 on the rails 216, 218 via two carriage wheels or rollers 222 above and below each rail engaging the upper and lower surfaces of the rails respectively.

As best seen in FIGURES 7 and 8, the carriage 184 has two vertical, laterally spaced, frontwardly opening channels 224, 226 extending to points adjacent the upper and lower ends of the carriage 184. The channels 224, 226 may extend, for instance, halfway through the thickness of the carriage 184. The channels 224 and 226 are intercommunicated by a narrow laterally extending forwardly opening groove 228 midway between the upper and lower ends of the carriage 184. The groove 228 thus underlies the X-axis when the carriage is mounted on the rails 216, 218.

A cover plate 230 is mounted on the front surface of the carriage 184 overlying the upper half of the channel 224 and terminating even with the upper extent of the groove 228. A cover plate 232 is mounted on the front surface of the carriage 184 overlying the lower half of the channel 224 and a second opposite side bar 188 is extent of the groove 228. The carriage 184 including the channels 224, 226 and cover plates 230, 232 are preferably all colored a uniform dark color, for instance flat black. A first opposite side bar 186 is slidingly received in the channel 224 and a second opposite side bar 188 is slidingly received in the channel 226. The opposite side bars 186 and 188 are each preferably colored a light color, for instance white, and are of such length that when fully bottomed in their respective covered channel halves, they protrude from the covers into lateral adjacency with the groove 228. In the respective protruding portions, the opposite side bars 186 and 188 are provided with U-shaped notches 234, 236 which face the center of the groove 228.

The hypotenuse of the reference right triangle of the apparatus 182 is provided by the assembly 238 shown in detail in FIGURES 9 and 12. The assembly 238 includes a hypotenuse bar 240 preferably light colored or white and marked with graduations and a catch support bar 242. As seen in the figures, the former overlies the latter, the bars 240 and 242 are parallel and one end of the bar 240 is fixedly secured to the corresponding end of the bar 242 by a hollow shaft 244 which extends perpendicular to each bar. The shaft 244 is journalled for rotation at the origin 200 in the X-axis, Y-axis juncture by bearing means 246 shown in FIGURE 12. The hypotenuse bar 240 is thus journalled for rotation in a plane just behind the X- and Y-axes. At a point on the hypotenuse bar 240 having equal radial distance from the origin 200 as the openings 204 and 206 on the X-axis each has, a small hole 248 is formed through the hypotenuse bar. Underlying the hole 248, a spring catch assembly 250, FIGURES 9 and 10, is mounted on the catch support bar 242 via a hole 252 formed in the bar 242.

The spring catch assembly 250 is shown including a catch 254 which includes an enlarged base having a flat bottom 256, and an upwardly, inwardly frusto-conical upwardly facing surface 258 which merges with a rod-like shank 260 that is threaded exteriorly at 262 near its upper extent. The catch 254 may conveniently comprise an inverted flat heat machine screw or flat head rivet. The catch 254 is inserted through the hole 252 from below so that a part of the catch 254 approximately equal in length to the thickness of the opposite side bars 186, 188 protrudes beneath the catch support bar 242. A washer 264 is received on the shank 260 from above the catch support bar 242, and is secured to the upper surface 266 of the bar 242 peripherally of the hole 252. A coil spring 268 is received on the shank 260 above the washer 264 and is secured at its lower end to the washer 264. A nut 270 is then threadably received on the shank 260 above the spring 268 and threaded downwardly so that the spring 268 is slightly compressed, for instance about ⅛ inch as seen in FIGURE 10.

The enlarged lower part 256, 258 of the catch 254 is inserted in the groove 228 and slid therein into the U-shaped notch 236 in the rightmost of the opposite side bars if the demonstration is to be first concerned with quadrants, one and two of the apparatus, or in the notch 234 in the leftmost of the opposite side bars if the demonstration is to be first concerned with the third and fourth quadrants. In either case, due to the slight pretensioning of the spring 268, the opposite side bar at its notch 234 or 236 will be pivotally squeezingly secured between the catch upper surface 258 and catch support bar 242 lower surface 272 with the shank 260 functioning as a pivot pin.

The apparatus 182 is completed by a 360 degree protractor 274 or the like, fixedly mounted on the outer end of a solid pin 276 having an inner end 278 of non-circular transverse cross-section. The pin 276 is removably insertable through the hollow shaft 244 and into a non-circular, forwardly opening socket of non-circular cross-sectional shape in the back board disk portion underlying the origin 200. The shape of the socket 280 prevents the pin 276 and protractor 274 from rotating as the hypotenuse is rotated. The 0 degree mark of the protractor is preferably placed in a three-o'clock position. It would be possible to simplify the protractor 274 mounting arrangement, as well as the mounting arrangement in each of the other embodiments by securing the protractor directly to the upper surface of the hypotenuse with the 0 degree mark of the protractor lying along the longitudinal centerline of the hypotenuse. The protractor would then rotate with the hypotenuse and the number of degrees in the reference angle $\phi$ between the hypotenuse and the X-axis could be read from the protractor at the point thereon which overlies the rightwardly extending part of the X-axis.

The apparatus 182 as shown in FIGURE 7 can be operated by grasping the hypotenuse bar 240 and rotating it counter-clockwise about the origin 200. Until the vertical is reached, each increment of counter-clockwise movement will withdraw more of the opposite side bar 188 into view to complete the reference triangle. As the angle $\phi$ reaches 90 degrees, the protractor 274 can be manually lifted up so that the carriage 184 will freely pass leftwardly under the origin. (As the hypotenuse assembly crosses the vertical upward portion of the Y-axis the hypotenuse bar passes in front of the Y-axis and the catch support bar passes behind the Y-axis, the Y-axis passing through the gap 282, FIGURE 9.) The protractor pin can then be pushed back into its socket. As counter-clockwise movement of the hypotenuse is continued, approaching the point where the reference angle $\phi$ equals 180 degrees, the carriage leading edge 284 engages and increasingly compresses the spring 212. When $\phi$ has reached 180 degrees, the hole 248 overlies the hole 204, FIGURE 10, and a small rod 286 can be inserted through the holes 248, 204 to contact and depress the spring catch 254 sufficiently into the gap 288 between the catch and the front face 290 of the groove 228 that the catch 254 loses frictional grasp of the opposite side bar 188 notch 236 periphery. The stop block spring 212 then recovers, pushing the carriage 184 rightwardly and the catch 254 into the opposite side bar 186 notch 234. The rod 286 need only be inserted momentarily. The frusto-conical upper surface of the catch lower enlarged portion aids the catch in being guided into the notch 234 frictionally gripping the bar 186 between the catch and the catch support bar. The whole transfer sequence just described is reliable and can be accomplished in one second or less. The hypotenuse can now be further rotated counter-clockwise which exposes more and more of the opposite side bar 186 until the $\phi$ equals 270 degrees point is reached, whereupon further rotation of the hypotenuse effects retraction of the opposite side bar 186 beneath its cover plate on the carriage 184 which is continuously moving rightwardly. When the now leading edge 292 of the carriage 184 engages and compresses the spring 214 a transfer of the hypotenuse assembly catch 254 from the opposite side bar 186 to the opposite side bar 188 can be effected similarly as discussed in relation to the transfer from the bar 188 to the bar 186. Obviously, the hypotenuse could be rotated clockwise as well as counter-clockwise.

A leaf spring 294, magnet or the like, can be used to counteract the effect of gravity on the opposite side bar 186 when it is supposed to be out of sight as shown in FIGURE 7.

The same material selection considerations as are applicable to the apparatus embodiments 10 and 90 apply to the apparatus 182.

It should now be apparent that the apparatus embodiments shown and described herein efficiently accomplish each of the invention's objects and clearly teach its principles. Because the apparatus can be considerably modified without departing from these principles or failing to accomplish these objects, the present invention should be understood as encompassing all such modifications as are within the spirit and scope of the following claims.

I claim:
1. A trigonometric function teaching machine comprising: a back board; means defining a X-axis indicating strip and a Y-axis indicating strip on said back board, said X-axis strip and Y-axis strip intersecting centrally of said back board to define an origin; a hypotenuse indicating bar pivotally supported adjacent one end thereof by said back board at said origin and in front of the back board for movement in a plane parallel to said back board; a rail mounted on the rear of said back board and extending horizontally therealong; a vertically elongated carriage; means mounting said carriage on said rail for reciprocal rectilinear movement in a horizontal direction along the rail and guided by the rail; means defining an opposite side indicator on said carriage; means defining an opening through said back board into which said opposite side indicator can be drawn to expose at least a portion thereof to view from the front of said back board; and means pivotally securing the opposite end of said hypotenuse indicating bar from said one end, to said opposite side indicator; thereby defining a reference triangle between said hypotenuse indicating bar, said opposite side indicator and said X-axis strip; said hypotenuse during rotation thereof being adapted to draw an increasing and decreasing portion of said opposite side indication into said opening for view from the front of said back board.

2. The apparatus of claim 1 wherein the rail is spaced from the rear of the back board and has means extending between and securing the rail to the back board, the last-mentioned means being located adjacent each end of the rail.

3. The apparatus of claim 2 wherein the carriage is positioned between the back board and the rail and the means mounting the carriage on the rail include means mounted on and extending from the carriage above and below the rail for contact with the rail.

4. The apparatus of claim 3 wherein the rail is metallic and the means mounted on and extending from the carriage comprise rollers.

5. The apparatus of claim 1 wherein the carriage has means defining a vertically directed, forwardly opening channel therein and wherein the opposite side indicator comprises a bar slidingly received in said channel.

6. The apparatus of claim 5 wherein the X-axis strip, the Y-axis strip, the hypotenuse indicating bar, and the opposite side indicator bar all have the forwardly facing surfaces thereof colored a light color and the back board and carriage both have the forwardly facing surfaces thereof colored a dark color.

7. The apparatus of claim 5 further comprising means defining a second vertically directed, forwardly opening channel in said carriage parallel to and horizontally spaced from the first-mentioned channel; a second opposite side indicator bar slidingly received in the second channel, a forwardly opening substantially horizontal groove in said carriage interconnecting the first-mentioned channel and said second channel adjacent the horizontal midline of said carriage; and means for effecting a transfer of the securement of said hypotenuse indicating bar opposite end from the first-mentioned opposite side indicator bar to the second opposite side indicator bar and for effecting a re-transfer of the securement of said hypotenuse indicating bar opposite end from the second opposite side indicator bar to the first mentioned opposite side indicator bar, the first-mentioned opposite side indicator bar being positioned for use when the angle between the X-axis and the hypotenuse indicating bar is in the range 0–180 degrees and the second opposite side indicator bar being positioned for use when the angle between the X-axis and the hypotenuse indicating bar is in the range 180–360 degrees.

8. The apparatus of claim 7 further including means on said carriage blocking from view from the front of said back board the one of said first-mentioned and said second opposite side indicator bars which is not in use.

9. The apparatus of claim 1 wherein the means pivotally securing the opposite end of said hypotenuse indicating bar from said one end, to said opposite side indicator comprises a releasable, spring urged clamp.

10. The apparatus of claim 1 further comprising a 360 degree protractor stationarily centrally mounted at said origin and having the 0 degree mark thereof easternmost.

References Cited

UNITED STATES PATENTS 3,137,443 6/1964 Samuelson.
3,302,308 2/1967 Colacurcio _____ 35—34

EUGENE R. CAPOZIO, *Primary Examiner.*

W. GRIEB, *Assistant Examiner.*